United States Patent Office 3,527,970
Patented Sept. 8, 1970

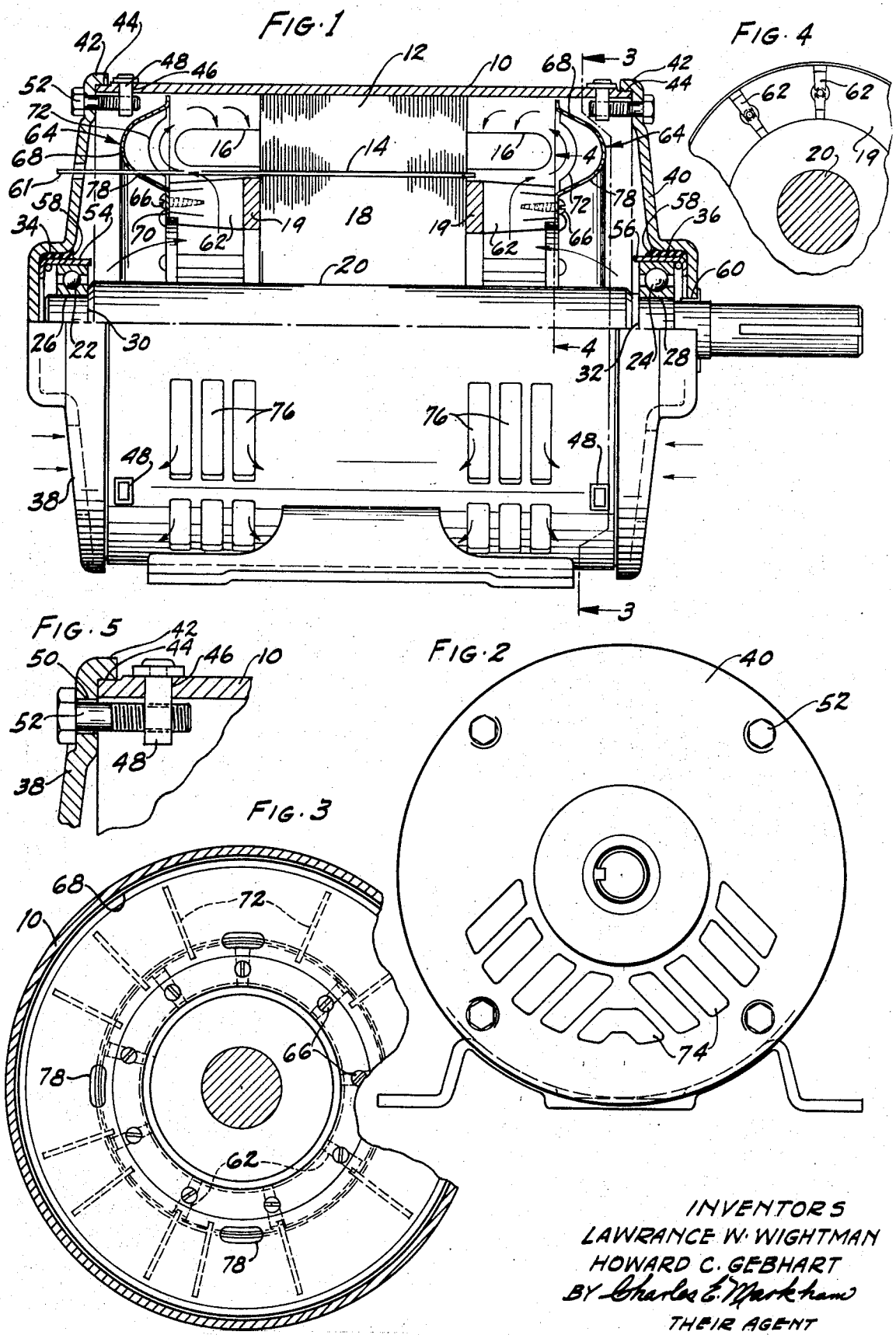

3,527,970
ELECTRIC MOTOR CONSTRUCTION AND VENTILATING SYSTEM
Lawrance W. Wightman, Creve Coeur, and Howard C. Gebhart, Chesterfield, Mo., assignors to Emerson Electric Co., St. Louis, Mo., a corporation of Missouri
Filed Oct. 9, 1968, Ser. No. 766,204
Int. Cl. H02k 9/06
U.S. Cl. 310—63                    3 Claims

ABSTRACT OF THE DISCLOSURE

A take-apart electric motor having a stator casing with a smooth, cylindrical, interior wall into which the stator core is fitted, in which large diameter fans on both sides of the stator core circulate cooling air at high velocity around the faces of the stator core, around and over the winding end turns, and around the interior surface of the stator casing on both sides of the stator, and in which rotor supporting end shields are detachably connected to the ends of the casing by removable means which permits the free, uninterrupted, circular flow of cooling air around the interior surface of the stator casing and permits the free axial assembly or removal of the stator core.

This invention relates to the construction and ventilation of dynamoelectric machines, particularly A.C. motors.

An object of the invention is to provide substantially improved ventilation or cooling means in an electric motor whereby greater horsepower output per pound of active material may be achieved.

A further object is to provide an improved electric motor construction including a stator casing with a smooth, interior, cylindrical wall into which the stator is fitted and having rotor supporting end shields detachably connected to the casing ends by means which does not obstruct the axial insertion or removal of the stator from the casing or interrupt the free circulation of air around an annular path extending outward to the interior wall of the casing.

A further object is to provide an improved, take-apart, electric motor construction having a stator casing with a smooth, interior, cylindrical wall uninterrupted by through bolts or axially extending lugs or ribs, thereby to provide uninterrupted annular spaces on both sides of the stator extending outward to the interior wall of the casing, in which large diameter circulating fans are positioned and operate to circulate cooling air at relatively high velocity around and over the end turns of the windings along the entire faces of the stator core and along the interior wall of the casing.

Other objects and advantages will appear from the following description when read in connection with the accompanying drawing.

In the drawing:

FIG. 1 is a half sectionalized, side elevational view of an A.C. electric motor constructed in accordance with the present invention.

FIG. 2 is a right side end elevational view of the electric motor shown in FIG. 1;

FIG. 3 is a transverse sectional view of the electric motor shown in FIG. 1, taken along line 3—3 of FIG. 1;

FIG. 4 is a fragmentary sectional view taken along line 4—4 of FIG. 1; and

FIG. 5 is an enlarged fragmentary sectional view showing the method of connecting the end shields to the stator casing.

Referring to the drawing in more detail, the motor has a cylindrical stator shell or casing 10 into which a laminated stator core 12 is assembled axially and fixed therein by press fitting, pinning, or other suitable means. The stator 12 has an axial bore 14 and windings indicated at 16. Mounted for rotation in bore 14 of the stator is rotor 18 including end rings 19 and a shaft 20. The shaft 20 is provided with ball bearings 22 and 24 having their inner races press fitted on accommodating diameter portions 26 and 28 of the shaft and abutting locating shoulders 30 and 32 formed on the shaft.

The bearings 22 and 24 are supported in internal circular recesses 34 and 36 formed in end shields 38 and 40, which end shields are detachably connected to the ends of the stator casing 10. End shields 38 and 40 are provided with axially extending rims 42 having internal surfaces which nicely fit on machined surfaces 44 at the ends of casing 10. The casing 10 is provided with circularly spaced rectangular holes 46 which receive removable rectangular nuts 48, and the end shields 38 and 40 have similarly spaced clearance holes 50 which receive bolts 52 threadedly engaging nuts 48 to detachably connect the end shields to the stator casing 10, see FIG. 5.

The ball bearings 22 and 24 are provided with bearing locating rings 54 and 56, which receive the outer races of the ball bearings in slip fit relationship, and the locating rings are loosely entered into the recesses 34 and 36. The annular spaces between the loosely fitting locating rings 54 and 56 and the axial interior wall surfaces of recesses 34 and 36 are filled with an adhesive structural cement 58, which is applied in soft paste form and subsequently hardens to rigidly fix the bearing locating rings 54 and 56 in the recesses. End shield 40 is further provided with a central aperture 60 through which an externally projecting end of shaft 20 passes.

The rotor is provided with circularly arranged, radial vanes 62 extending axially outward from the end rings 18 at both ends of the rotor and are preferably cast integral with the end rings. The rotor is further provided with a large diameter, circulatin gblower at each end thereof, generally indicated at 64. The blowers 64 each comprise an annulus 68 formed of sheet stock and having a generally semicircular, cross-sectional configuration, and an inner lip or flange 70 which overlies and is connected to the outer ends of vanes 62 by screws 66. The blower annuluses 68 are arranged with their concave sides facing inward toward the stator end faces and are of such diameter that their peripheries have a close running fit with the inner wall surface of casing 10.

The annuluses 68 are provided with circularly spaced vanes 72 extending radially across their concave surfaces. The vanes 62 projecting axially from the rotor end rings and the vanes 72 in the fans 64 are unequally spaced in such manner that no equal spaces occur between any adjacent vanes 62 or any adjacent vanes 72, see FIG. 3. This provision is made to reduce the noise level.

In assembling the rotor and the end shields, the rotor, with ball bearings 22 and 24 fixed on shaft 20, is inserted in the stator bore 14 and temporarily fixed concentrically therein by suitable removable shims 61, the ends of which project at one side through suitable access holes in fan 64 and in end shield 38. The bearing locating rings 54 and 56 are slip fitted on the outer races of the bearings, and cemant 58 is applied in paste form to the outer peripheral surfaces of the locating rings. The end shields are then moved axially inward and fitted on the ends of casing 12, the nuts 48 are inserted, and bolts 52 are entered and tightened. Heat is then applied to the cement 58 and it is thereby hardened. Thereafter, the shims are withdrawn. If, for any reason, it is desirable to disassemble the end shields after the cement has hardened, the insertion and tightening of the bolts 52 may be omitted prior to the heating and hardening of the cement because the fit of the end shield on machined surfaces of the casing, and not the attaching bolts, maintains the concentricity established by shimming the rotor and positioning the locating rings in the end shield recesses.

When the motor is in operation, cooling air enters the central portion of the motor casing through vents 74 in the lower halves of the end shields. The circular velocity imparted to the air by vanes 62 and 72 causes it to move radially outward, due to centrifugal force, through the annular space between the faces of the rotor and stator and the blower 64. Upon encountering the end turns of the windings 16, most of the air is deflected laterally outward towards the concave surfaces of fan annuluses 68 which again deflect it laterally inward toward the wall of the casing and the face of the stator core. The air then moves circularly around the interior wall of the casing 10 and is exhausted through parts 76 in the lower half of the casing. The considerably higher velocity imparted to the air by vanes 72 greatly increases the rate at which the heat generated in the rotor and stator is removed from these elements and thereby permits substantially greater electrical energy input and, consequently, horsepower outtput without undue heating of the motor.

In some motor designs it may occur that the restricting point of cooling air flow occurs at the central opening of the annulus 68 due to relative diameters of the motor shaft and rotor. In such cases it has been found that cailbrated perforations 78 in the annuluses 68 effect a substantial increase in air flow over the field winding end turns and stator faces.

We claim:

1. In an electric motor, a stator, a hollow cylindrical casing fitted on said stator and having end portions extending beyond the ends thereof, end walls at the ends of said casing, means confined to the ends of said casing connecting said end walls thereto, whereby end spaces in said casing between the ends of said stator and said end walls unobstructed by end wall connecting means are provided, a rotor mounted for rotation in said stator including a shaft journalled in said end walls, a blower in each of said end spaces comprising an annulus spaced axially outward from the end of said stator and connected to the end of said rotor for rotation therewith, said annulus having a concave surface coextending radially with the end face of said stator and a peripheral edge in close running fit relationship with the wall of said casing, vents in said end walls, and circularly spaced vents in said casing walls between the ends of said stator and the peripheral edges of said annuluses, and circularly spaced vanes on said annuluses extending radially across their said concave surfaces, whereby cooling air is drawn inward through said end wall vents and the centers of said annuluses and directed at high velocity toward the end faces of said stator, along the annular surfaces of said stator end faces, along the adjacent wall of said casing in said unobstructed spaces, and thence outward through said casing vents.

2. An electric motor as set forth in claim 1 in which said annuluses are formed from sheet stock and have a cross-sectional configuration of concavo-convex form with an inner, flat, flange portion connected to said rotor and in which said annuluses lie in a plane substantially perpendicular to said motor shaft.

3. An electric motor as set forth in claim 2 which further includes vanes connected to the ends of said rotor extending radially across the end faces thereof and axially outward from the ends thereof, and in which said inner, flat, flange portions of said annuluses lie against and are connected to the ends of said vanes.

References Cited

UNITED STATES PATENTS

| 1,858,261 | 5/1932 | Barnholdt | 310—63 |
| 1,920,315 | 8/1933 | Myers | 310—63 |
| 2,447,657 | 8/1948 | Ludwig et al. | 310—211 |
| 2,462,516 | 2/1949 | Le Tourneau | 310—211 |
| 2,722,618 | 11/1955 | Dochterman | 310—254 |
| 2,809,307 | 10/1957 | Muczenski et al. | 310—63 X |
| 2,970,233 | 1/1961 | Penney | 310—63 |
| 2,970,234 | 1/1961 | Erickson | 310—63 |
| 3,024,378 | 3/1962 | Isgren et al. | 310—211 |
| 3,243,617 | 3/1966 | Cunningham | 310—63 |

FOREIGN PATENTS 560,135   9/1932   Germany.

DONOVAN F. DUGGAN, Primary Examiner

U.S. Cl. X.R.

310—254